H. McL. ARMISTEAD.
TRANSMISSION.
APPLICATION FILED OCT. 7, 1918.

1,341,162.

Patented May 25, 1920.
3 SHEETS—SHEET 3.

INVENTOR
H. McL. Armistead

UNITED STATES PATENT OFFICE.

HUBERT McL. ARMISTEAD, OF SAN FRANCISCO, CALIFORNIA, ASSIGNOR TO ARMISTEAD-ASHLEY ENGINEERING CORPORATION, OF RENO, NEVADA, A CORPORATION OF NEVADA.

TRANSMISSION.

1,341,162.  Specification of Letters Patent.  Patented May 25, 1920.

Application filed October 7, 1918. Serial No. 257,291.

*To all whom it may concern:*

Be it known that I, HUBERT McL. ARMISTEAD, a citizen of the United States, and a resident of the city and county of San Francisco, State of California, have made a new and useful invention—to wit, Transmission; and I do hereby declare the following to be a clear, full, concise, and exact description of the same.

The present invention is an improved transmission for automotive trucks, tractors and the like.

An object of the invention is to provide means for imparting variable speeds in either direction to the rear or driving elements, either wheel or track laying elements of said tractors.

Other objects of the invention will appear as the description proceeds.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatever form it may be embodied.

In the accompanying three sheets of drawings, the invention is shown as designed for use on a tractor of the track laying type, but it is to be understood that the transmission is susceptible to various general uses.

Figure 1:
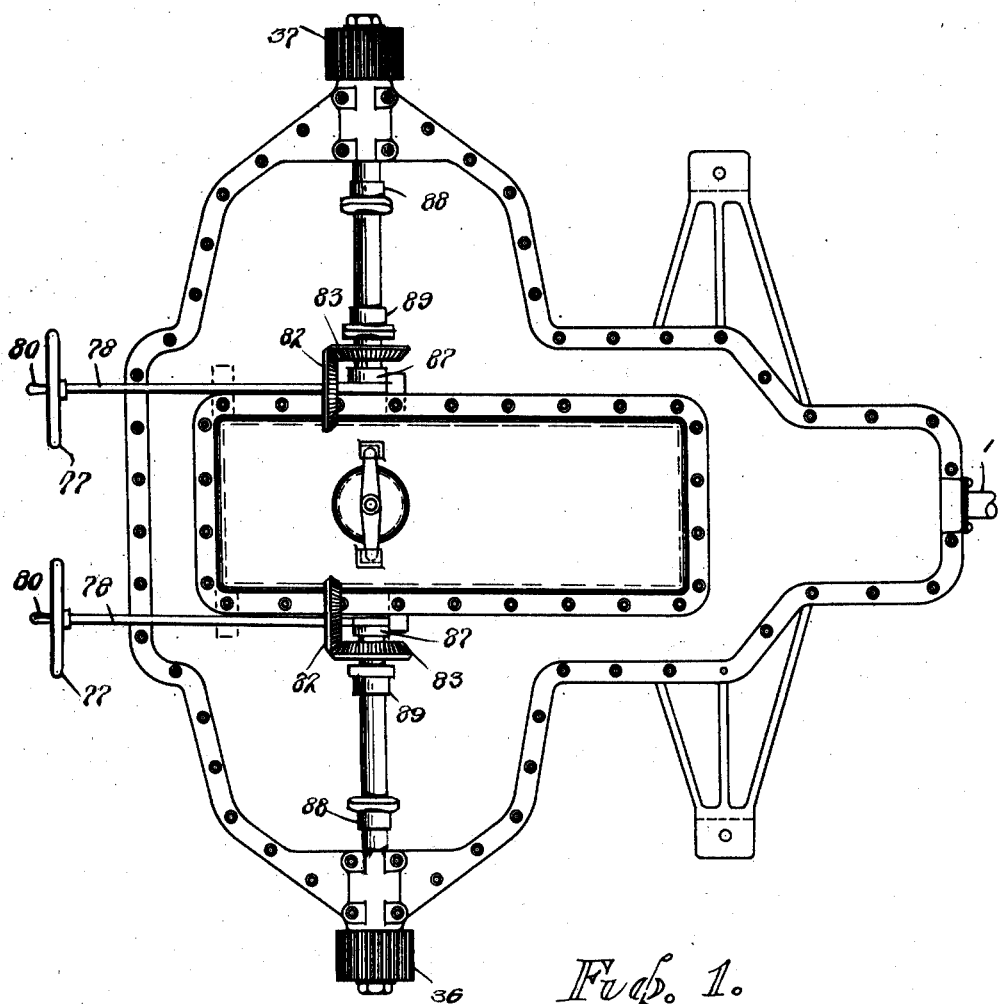
Figure 2:
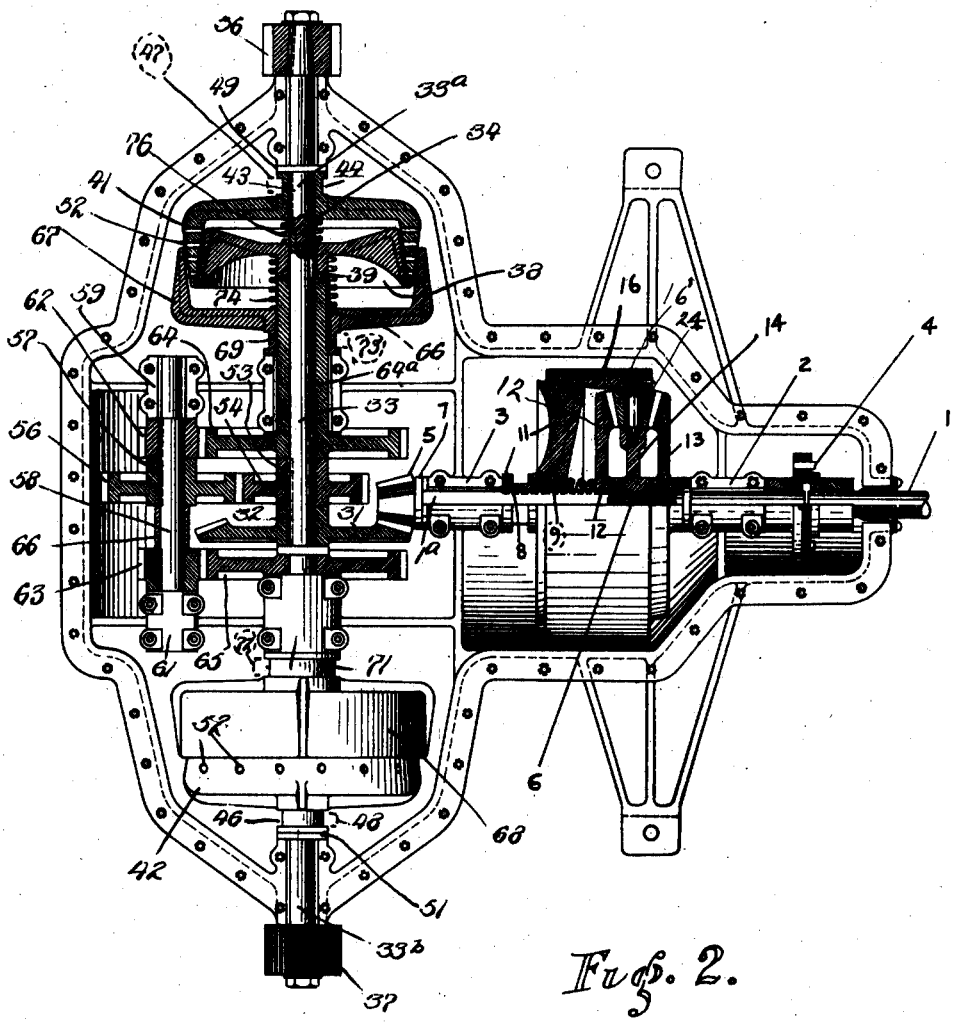
Figure 3:
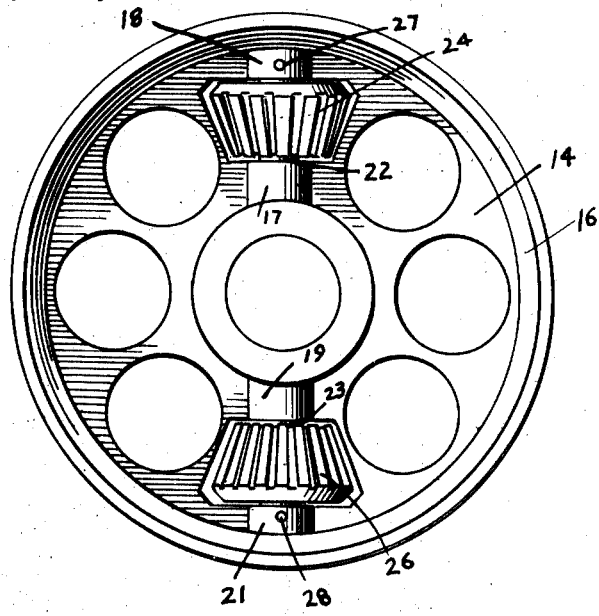
Figure 5:
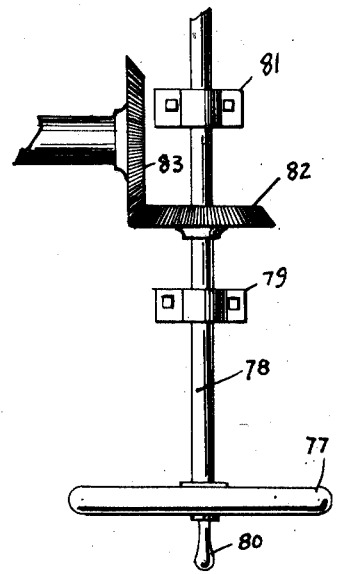
Figure 4:
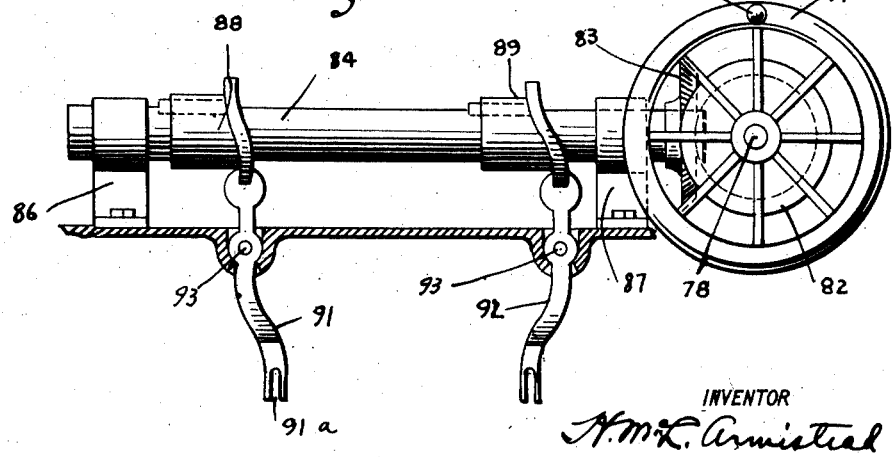

In the accompanying drawings, Figure 1 is a plan view of the outer casing of my improved transmission showing the various lever controls, Fig. 2 is a plan view of same with the upper half of the housing removed and showing a portion of the transmission mechanism in section, Fig. 3 is a side elevation of a differential, Fig. 4 is a rear elevation of a collar shifting mechanism, and Fig. 5 is a plan view of a portion of Fig. 4.

Referring to the drawings, in which like numerals refer to like parts throughout, the numeral 1 indicates a divided engine shaft journaled in suitable bearings 2 and 3. The shaft is provided with any suitable universal joint 4; here shown as of conventional disk and pin type. The bearings 2 and 3 are split; the bottom half preferably being integral with the lower half of the casing. The bearing 2 supports the engine shaft 1 and bearing 3 supports another member 1ª of the divided engine shaft. The shaft 1 is journaled as shown at 6 in the end of shaft 1ª.

Secured to the opposite end of the shaft 1ª is a bevel pinion 5 provided with a thrust collar 7, preferably integral with said shaft. The shaft 1ª is provided with a key-way as shown at 8 to slidably engage a key 9. The function of the key 9 is two fold. It serves to form a slidable engagement with the cone clutch 11 and also acts as a fixed key for securing a bevel gear 12 to the shaft 1ª.

A bevel gear 13, similar in size and pitch and diameter to the gear 12 is keyed fixedly to the shaft 1. Journaled on the shaft 1 is a disk 14 provided with an annular flange 16; the inner periphery of which is conic-concave and adapted to receive the cone clutch 11. The disk 14 is provided with diametrically opposed pairs of bearings, 17, 18, 19, 21, and comprising bosses integral with said disk.

The bearings are for stub shafts 22 and 23 carrying planetary bevel gears 24 and 26. The said planetary gears 24 and 26 mesh at all times with both bevel gears 12 and 13; while the disk 14 rotates freely in either direction on the shaft 1. The gears 24 and 26 are secured on the stub shafts by tapered pins 27 and 28. The operation of the bevel gears 12 and 13, disk 14 and gears 24 and 26 is as follows:—

Assuming that it is desired to drive in one direction, the cone clutch 11 is brought into contact with the conical face of the member 16 which is carried by the disk 14 and revolves therewith. The disk 14 is driven from the gear 13, which is keyed to the shaft 1 through the medium of spur gears 24 and 26, which will be held stationary by the gear 12 keyed to the shaft 1ª. When it is desired to reverse, the cone clutch 11 is withdrawn from contact with the member 16 and the band 16' is brought into contact with the periphery of the member 16 which holds the same stationary with relation to the housing of the transmission. When held stationary, motion will be transmitted from the shaft 1 through gear 13 to spur gears 24 and 26 which will revolve upon their stub shafts and drive the gear 12 in a reverse direction, which in turn will drive the shaft 1ª in the same direction as the gear 12 to which it is keyed.

The bevel pinion 5 meshes with a bevel gear 31 keyed as shown at 32 to a cross shaft 33. The cross shaft 33 is composed of three parts:—33, 33ª and 33ᵇ, the shafts 33ª and 33ᵇ being provided with ends of reduced diameter and journaled in the ends of the shaft 33, as shown at 34.

In Fig. 2, the parts secured to cross shaft 33ª are shown in section, while 33ᵇ and parts relative thereto are shown in plan. It will be understood that they are alike in every respect.

The function of the shafts 33, 33ª and 33ᵇ is to drive pinions 36 and 37, which mesh with internal gearing forming part of any suitable wheel drive or sprocket wheel drive for tractors of wheel or track laying type. The object of the invention, and parts hereinafter described is to impart variable speeds in either direction to the gears 36 and 37.

The direct or high gear drive is accomplished, as follows:—The pinion 5 drives (through the gear 31) the shaft 33 and two cones 38 (only one of which is here shown) which said cones are fixedly keyed to said shaft 33, as shown at 39 at the ends of shaft 33.

The shafts 33ª and 33ᵇ are provided with cone clutches 41, 42 respectively slidably keyed to said shafts, as shown at 43. The cone clutches 41 and 42 are provided with annular grooves 44 and 46 for engaging shifting collars 47 and 48. The shafts 33ª and 33ᵇ are provided with thrust collars 49 and 51, preferably integral with said shafts.

The entire transmission here shown is intended to be driven in a bath of oil, and, in order to provide for the displacement of oil film, the cone clutches 41 and 42 are provided with a plurality of ports 52.

When the pinion 5 drives (through gear 31), the shaft 33 and cone clutches 41 and 42 engage the cones 38, the shafts 33ª and 33ᵇ are driven at the same speed and in the same direction as the shaft 33.

In order to drive the shafts 33ª and 33ᵇ at a slower speed than that of shaft 33 when driven in the same manner by pinion 5, I provide the following mechanism:—

Fixedly keyed, as shown at 53, to shaft 33 is a gear 54 meshing with a gear 56, fixedly keyed, as shown at 57, to a counter shaft 58, journaled at each end in bearings 59 and 61; the lower half of each bearing being integral with the bottom half of the gear casing. The counter shaft 58 is preferably reduced at its ends for the lengths of the bearings to prevent any undue longitudinal movement thereof. Also keyed fixedly to the counter shaft 58 are gears 62 and 63 meshing respectively with gears 64 and 65 rotating freely on shaft 33.

In order to space the gears 56 and 63, and to keep the keys and gears in proper place, I provide a spacer bushing 66 journaled on the counter shaft 58.

Integral with the gears 64 and 65 are sleeves 64ª, through which sleeves extends the shaft 33, the said sleeves acting as bearings for said shaft.

Slidably keyed to the sleeves 64ª, as shown at 66, are cone clutches 67, 68 provided with annular grooves 69, 71 for engagement with shifting collars 72 and 73.

The cone clutches 67 and 68 are normally spaced from the cones 38 by expansion springs 74 coiled around a hub on cone 38 and the end of sleeve 64ª.

The cone clutches 41 and 42 are normally spaced from the cones 38 by expansion springs 76 coiled around the end of shaft 33.

The low or indirect drive for the gears 36, 37 is accomplished as follows:—

The pinion 5, in mesh with gear 31, drives the shaft 33 and gear 54, keyed thereto, which in turn drives gear 56 keyed to counter shaft 58, thus driving gears 62 and 63 which are fixedly keyed to said counter shaft 58.

The gears 62 and 63 drive respectively gears 64 and 65, the sleeves 64ª integral therewith and cone clutches 67 and 68 slidably keyed to said sleeves.

The cone clutch shift necessary to set the low or indirect drive in motion causes the clutches 67 and 68 to engage the clutches 41 and 42 respectively and thus bridge the cones 38 which revolve freely without contacting with either clutch.

When the four clutches are thus engaged, gears 36, 37 are rotated in the same direction as the shaft 33 but at a slower speed. The clutch shifts are accomplished in the following manner:—

The shift collars 47, 48 and 72, 73 are actuated by similar controls, secured to either side of the top half of the casing. A shift wheel 77 having a handle 80 is secured on one end of a shaft 78 suitably journaled as shown at 79, 81.

Secured to said shaft is a bevel gear 82 meshing with a like bevel gear 83 keyed to a cross shaft 84 journaled as shown at 86, 87 in bearings carried by the top half of the casing. Keyed or pinned to the cross shaft 84 are cam collars 88, 89 adapted when the shaft 84 is rotated to reciprocate in directions transverse to said shaft levers 91 and 92, pivoted as shown at 93. The levers 91, 92 are provided with yokes 91ª adapted to shift collars 47, 48, 72 and 73, in a well known manner.

In operation, the handle 80 on shift wheel 77 is normally on a horizontal plane with the axis of said shift wheel and all clutches in neutral position, but when the handle 80 is rotated 90° of a revolution up or down, the said clutches are thrown into low indirect or high direct drive respectively.

Having thus described my invention what I claim as new and desire to secure by Letters Patent of the United States is as follows:—

1. In a power transmission, a divided engine shaft, a reversing means mounted thereon and forming a connection between the abutting ends of said divided engine shaft, a divided cross shaft, gears fixedly keyed to the central section of said divided cross shaft, cone clutches carried at the outer ends of the central section of said cross shaft, cone clutches fixedly keyed to the inner ends of the outer sections of said divided cross shaft, gears carried at the outer ends of said last mentioned shaft sections, a pinion keyed to said engine shaft and meshing with one of said gears on said central section of said divided cross shaft, a counter shaft parallel with said central section of said divided cross shaft, a gear keyed to said counter shaft and in mesh with the other of said gears keyed to said central section of said cross shaft, gears of smaller diameter keyed to said counter shaft, gears of larger diameter freely rotatable on said central section of said divided cross shaft, and in constant mesh with said gears of lesser diameter on said counter shaft, tubular portions integral with each of said last mentioned large gears, cone clutches slidable on said tubular portions and adapted to engage said cone clutches carried at the inner ends of said outer sections of said divided cross shaft, and means for retaining all of said cone clutches out of engagement with each other.

2. In a power transmission, a divided engine shaft, a reversing means mounted thereon, and forming means for uniting the abutting end of said divided shaft, a divided cross shaft, gears fixedly keyed to the central section of said divided cross shaft, cone clutches carried at the outer ends of the central section of said cross shaft, cone clutches fixedly keyed to the inner ends of the outer sections of said divided cross shaft, gears carried at the outer ends of said last mentioned shaft sections, a pinion keyed to said engine shaft and meshing with one of said gears on said central section of said divided cross shaft, a counter shaft parallel with said central section of said divided cross shaft, a gear keyed to said counter shaft and in mesh with the other of said gears keyed to said central section of said cross shaft, gears of smaller diameter keyed to said counter shaft, gears of larger diameter freely rotatable on said central section of said divided cross shaft, and in constant mesh with said gears of lesser diameter on said counter shaft, tubular portions integral with each of said last mentioned large gears, cone clutches slidable on said tubular portions and adapted to engage said cone clutches carried at the inner ends of said outer sections of said divided cross shaft, means for retaining all of said cone clutches out of engagement with each other, and means for shifting said clutches into respective engagement with each other to vary the speed of rotation of the gears carried at the outer ends of said divided cross shaft.

In testimony whereof, I have hereunto set my hand at San Francisco, California, this 26th day of September, 1918.

HUBERT McL. ARMISTEAD.